(12) United States Patent
Morello (10) Patent No.: US 7,711,645 B2
(45) Date of Patent: May 4, 2010

(54) SYSTEM AND METHOD FOR PROCESSING PAYMENTS

(75) Inventor: Anthony Morello, Canton, OH (US)

(73) Assignee: Christina Stanley Morello

( * ) Notice: Subject to any disclaimer, the term of this patent is extended or adjusted under 35 U.S.C. 154(b) by 135 days.

(21) Appl. No.: 11/839,647

(22) Filed: Aug. 16, 2007

(65) Prior Publication Data

US 2008/0147544 A1     Jun. 19, 2008

Related U.S. Application Data

(60) Provisional application No. 60/888,287, filed on Feb. 5, 2007, provisional application No. 60/870,104, filed on Dec. 15, 2006.

(51) Int. Cl.
*G06Q 40/00* (2006.01)
(52) U.S. Cl. .............................. 705/45; 705/14; 705/35; 705/38; 705/39; 705/40; 705/42; 705/44
(58) Field of Classification Search .................. 705/14, 705/35, 38, 39, 40, 42, 44, 45
See application file for complete search history.

(56) References Cited

U.S. PATENT DOCUMENTS 7,072,862 B1 *   7/2006   Wilson ......................... 705/31

OTHER PUBLICATIONS

Kemp, "Discover Debuts It's First Platinum Card", DM News, Jan. 4, 1999, p. 2.*
Manniz, "It's Payback Time", U.S. News & World Report, 1994, vol. 117, No. 11, p. 77.*
"Discover's Platinum May Stand Out in the Platinum Crowd", Credit Card News, Jan. 15, 1999.*

* cited by examiner

*Primary Examiner*—James A Kramer
*Assistant Examiner*—Shahid R Merchant (57) ABSTRACT

A method for processing payments is provided that includes receiving with at least one server data representative of a plurality of payments. For at least one of the payments, the at least one server causes data representative of at least one third party offer to be mailed to the payee associated with the payment along with a check for the payment amount of value associated with the payment. The method also includes receiving with the at least one server, data representative of an acceptance of the at least one third party offer. Responsive to the acceptance, the at least one server may cause: a gift certificate to be issued to the payee; value in the amount of the payment minus a service fee to be transferred to a merchant associated with the at least one third party offer; and to cause the check to be voided.

2 Claims, 12 Drawing Sheets

CHECK ACTIVITY FILE

Provided by the remittance processor, this is a file of non-electronic remittance payment volume drawn on corporate accounts (good funds processing model).

| FIELD | DESCRIPTION | EXAMPLE ENTRY |
|---|---|---|
| Check Number | Check number | 123456789 |
| Funding Account | Funding account number (corporate good funds) | 123456789 |
| Payment Amount | Payment amount ($) | $275.00 |
| Payer Name | Name of person or entity submitting payment | Joe Smith |
| Payer Address | Street address of person or entity submitting payment | 123 Main Street |
| Payer City, State | City and State of person or entity submitting payment | Dallas, TX |
| Payer Zip | Zip code of person or entity submitting payment | 75206 |
| Payer Phone | Phone number of person or entity submitting payment | (214) 555-1212 |
| Payer Account Number | Account number of person or entity submitting payment (assigned by payee) | 123456789 |
| Delivery Date | Requested payment delivery date | 6/15/2007 |
| Payee Name | Name of payee receiving payment | Fred Jones |
| Payee Address | Address of payee receiving payment | 123 Main Street |
| Payer City, State | City and State of person or entity receiving payment | Dallas, TX |
| Payer Zip | Zip code of person or entity receiving payment | 75206 |
| Payee Phone | Phone number of payee receiving payment | (214) 555-1212 |
| Personal Payee | Indicate if payee is an individual | Y/N |
| Business Payee | Indicate if payee is a business | Y/N |

FIG. 5

| FIELD | DESCRIPTION | EXAMPLE ENTRY |
|---|---|---|
| MERCHANT INCENTIVE OFFER FILE | | |
| Completed and provided by the merchant, this file contains the needed information concerning incentive offers to populate the Merchant Offer Database of the present invention. This file may be utilized via a real-time or batch environment to enable remittance processors to include appropriate information within each payment (i.e. on check, on check carrier, as a stuffer, on envelope or within email message). | | |
| Incentive Offer % | Incentive offer percentage (i.e. $250 payment with 5% incentive offer equals $12.50 total incentive value) | 5% |
| Incentive Offer Matrix | Incentive offer $ amount (y) per payment range (x) (offered rather than % offer, as desired by Merchant): <br> • x < $25 = $y (incentive amount) <br> • $25.01 - $50 = $y <br> • $50.01 - $75 = $y <br> • $75.01 - $100 = $y <br> • $100.01 - $250.00 = $y <br> • $250.01 - $500 = $y <br> • $500.01 - $750.00 = $y <br> • $750.01 - $1,000 = $y <br> • $1000.01 - $2,500 = $y <br> • $2,500.01 - $5,000 = $y <br> • x > $5,000 = $y | n/a (i.e. incentive offer % will be utilized for this offer) |
| Effective Date | Effective date for a particular incentive offer | 10/01/07 |
| Stale Date | End date for a particular incentive offer | 01/01/08 |
| Volume Limit | Quantity limit for a particular incentive offer (i.e. offer may be included within x number of remittance payments). | 100,000 |
| Incentive Limit – Per Payment | Incentive $ value limit for a particular payment (i.e. incentive offer may not exceed $X for a particular payment. | $500 |
| Incentive Limit – All Payments | Incentive $ value limit for all payments (i.e. total of all incentive offers may not exceed $X for a particular incentive offer. | $500,000 |
| Personal Consumer | Offer extended to personal consumers only | NO |
| Business Consumer | Offer extended to business consumers only | YES |
| Personal/Business Consumer | Offer extended to both personal and business consumers | YES |
| State | Offer extended to particular states only | TX |
| Zip Code | Offer extended to consumers within particular ZIP codes only | 75206 |
| Repeat Offers | More than one incentive offer may be extended to a particular consumer | YES |
| Repeat Offer Limit | Limit of repeat incentive offers which may be extended to a particular consumer | 10 |
| Store Location | Physical store location to be referenced with the incentive offer | STORE #123; DALLAS, TX |
| Phone Number | Merchant phone number to be referenced with the incentive offer | 214-000-0000 |
| SIC CODE | Offer extended to business within specific SIC CODE parameters | n/a |

FIG. 6

Enclosed is your ANYWHERE BANK online bill payment in the amount of $278.00 from:

NAME: JOE SMITH
ADDRESS: 123 MAIN STREET
CITY, STATE, ZIP: FAIRWAY, KS 64113
ACCOUNT NUMBER: 123-456-789

← 44

Please post this payment to the consumers account as soon as possible.

IMPORTANT PAYMENT NOTIFICATION:
Your $278.00 payment is worth $291.90 at many popular retailers!

It's easy. Simply visit MyPaymentSpace.com to use your payment at any of our preferred vendors including Company A, Company B and more.

Your $278.00 payment can be instantly redeemed for a gift card worth $291.90!

- It's Quick, Convenient & FREE – Simply visit MyPaymentSpace.com to instantly "cash" your check for a store gift card from many popular retailers. If you prefer, you can bring your check directly to a participating retailer to obtain your gift card today*.
- It's Easy, Safe and Secure – You will instantly be issued a gift card or electronic gift card number, which you can use to purchase anything you want to at your favorite merchant.
- Your Financial Information Remains Private – Purchase online with confidence without using your financial information during checkout!

COMPANY A OFFER     COMPANY B OFFER   COMPANY C OFFER

Want To Receive Future Payments Electronically?
Visit MyPaymentSpace.com if you would like this and future payments electronically credited to your bank checking account, stored-value card or other options.

About MyPaymentSpace.com
MyPaymentSpace.com processes online payments for banks and credit unions nationwide. To learn more or to speak with a Customer Service Representative, please call (888) 123-1234.

*Note: Upon issue of the gift card number, the check below will be void.

REGISTERED PAYEE FILE

This file is established by the payee (upon initial visit to the service provider's online site) providing appropriate credentials including but not limited to Social Security Number, Employee Identification Number, name, address, telephone, etc. This information will populate the Payment Database, and will be used to decision remittance method (paper check or electronic) as well as send electronic (i.e. email) payment pending notifications.

| REQUIRED FIELD | DESCRIPTION | EXAMPLE ENTRY |
|---|---|---|
| Payee Name | Name of payee receiving payment | Fred Jones |
| Payee Address | Address of payee receiving payment | 123 Main Street |
| Payer City, State | City and State of person or entity receiving payment | Dallas, TX |
| Payer Zip | Zip code of person or entity receiving payment | 75206 |
| Payee Phone | Phone number of payee receiving payment | (214) 555-1212 |
| Tax ID Number | Tax ID Number | 12-3456789 |
| Email Address | Email Address | FJones@yahoo.com |
| Business Representative – First Name | First name of business representative | Ann |
| Business Representative – Last Name | Last name of business representative | Smith |
| Business Representative – Position | Company position of business representative | Administrative Assistant |
| Drivers License State | State drivers license was issued | Texas |
| Drivers License Number | Drivers license number | RB123456789 |
| Drivers License Expiration Date | Drivers license expiration date | 07/21/2009 |
| Credit Card Number | Credit card number | 123-456-789 |
| Name of Card Holder | Name of credit card holder. In this case, Ann Smith, administrative assistant, is cardholder | Ann Smith |
| Name of Business of Card Holder | Name of business to which card is issued (business payees only) | Fred Jones Construction LLC |

FIG. 8

CONVERTED PAYMENT FILE

Completed and provided by the service provider, this file reports converted activity to the remittance processor. The remittance processor will void checks for all converted payments.

| REQUIRED FIELD | DESCRIPTION | EXAMPLE ENTRY |
|---|---|---|
| Converted Payment | Indicates that payment has been converted (i.e. payee has accepted incentive offer) | YES |
| Conversion Date | Date which incentive offer was accepted | 7/15/2007 |
| Merchant Number | Indicates specific merchant where offer was accepted (i.e. ABC Company = Merchant #123) | 123 |
| Check Number | Check number | 123456789 |
| Funding Account | Funding account number (corporate good funds) | 123456789 |
| Payment Amount | Payment amount ($) | $275.00 |
| Payer Name | Name of person or entity submitting payment | Joe Smith |
| Payer Address | Street address of person or entity submitting payment | 123 Main Street |
| Payer City, State | City and State of person or entity submitting payment | Dallas, TX |
| Payer Zip | Zip code of person or entity submitting payment | 75206 |
| Payer Phone | Phone number of person or entity submitting payment | (214) 555-1212 |
| Payer Account Number | Account number of person or entity submitting payment (assigned by payee) | 123456789 |
| Delivery Date | Requested payment delivery date | 6/15/2007 |
| Payee Name | Name of payee receiving payment | Fred Jones |
| Payee Address | Address of payee receiving payment | 123 Main Street |
| Payer City, State | City and State of person or entity receiving payment | Dallas, TX |
| Payer Zip | Zip code of person or entity receiving payment | 75206 |
| Payee Phone | Phone number of payee receiving payment | (214) 555-1212 |
| Personal Payee | Indicate if payee is an individual | Y/N |
| Business Payee | Indicate if payee is a business | Y/N |
| Incentive Offer ($) | Incentive offer amount ($). For example, a $275 payment with 10% incentive offer = $27.50 incentive. | $27.50 |
| Total Payment Value | Equals payment value plus incentive offer amount. For example, a $275 payment with 10% incentive offer equals $275 + $27.50 for Total Payment Value of $302.50. | $302.50 |
| Business Representative – First Name | First name of business representative | Ann |
| Business Representative – Last Name | Last name of business representative | Smith |
| Business Representative – Position | Company position of business representative | Administrative Assistant |
| Drivers License State | State drivers license was issued | Texas |
| Drivers License Number | Drivers license number | RB123456789 |
| Drivers License Expiration Date | Drivers license expiration date | 07/21/2009 |
| Credit Card Number | Credit card number | 123-456-789 |
| Name of Card Holder | Name of credit card holder. In this case, Ann Smith, administrative assistant, is cardholder. | Ann Smith |
| Name of Business of Card Holder | Name of business to which card is issued (business payees only) | Fred Jones Construction LLC |

FIG. 9

GIFT CARD FILE

Completed and provided by the service provider, this file is forwarded to the merchant or merchant's processor to execute delivery of plastics and/or electronic cards according to existing procedures.

| FIELD | DESCRIPTION |
|---|---|
| Incentive Offer Number | Assigned by Merchant to track unique offers. |
| Payee Name | Name of payee receiving payment |
| Payee Address | Address of payee receiving payment |
| Payer City, State | City and State of person or entity receiving payment |
| Payer Zip | Zip code of person or entity receiving payment |
| Payee Phone | Phone number of payee receiving payment |
| Personal Payee | Indicate if payee is an individual |
| Business Payee | Indicate if payee is a business |
| Incentive Offer ($) | Incentive offer amount ($). For example, a $275 payment with 10% incentive offer = $27.50 incentive. |
| Total Payment Value | Equals payment value plus incentive offer amount. For example, a $275 payment with 10% incentive offer equals $275 + $27.50 for Total Payment Value of $302.50. |

FIG. 10

| PAYMENT MATCH FILE |||
|---|---|---|
| Completed and provided by the service provider to the merchant and remittance processor, this file indexes promotions offered with particular payments. This file may be referenced for tracking activity as well as risk mitigation. |||
| FIELD | DESCRIPTION | EXAMPLE ENTRY |
| Check Number | Check number | 123456789 |
| Funding Account | Funding account number (corporate good funds) | 123456789 |
| Payment Amount | Payment amount ($) | $275.00 |
| Payer Name | Name of person or entity submitting payment | Joe Smith |
| Payer Address | Street address of person or entity submitting payment | 123 Main Street |
| Payer City, State | City and State of person or entity submitting payment | Dallas, TX |
| Payer Zip | Zip code of person or entity submitting payment | 75206 |
| Payer Phone | Phone number of person or entity submitting payment | (214) 555-1212 |
| Payer Account Number | Account number of person or entity submitting payment (assigned by payee) | 123456789 |
| Delivery Date | Requested payment delivery date | 6/15/2007 |
| Payee Name | Name of payee receiving payment | Fred Jones |
| Payee Address | Address of payee receiving payment | 123 Main Street |
| Payer City, State | City and State of person or entity receiving payment | Dallas, TX |
| Payer Zip | Zip code of person or entity receiving payment | 75206 |
| Payee Phone | Phone number of payee receiving payment | (214) 555-1212 |
| Personal Payee | Indicate if payee is an individual | Y/N |
| Business Payee | Indicate if payee is a business | Y/N |
| Incentive Offer ($) | Incentive offer amount ($). For example, a $275 payment with 10% incentive offer = $27.50 incentive. | $27.50 |
| Total Payment Value | Equals payment value plus incentive offer amount. For example, a $275 payment with 10% incentive offer equals $275 + $27.50 for Total Payment Value of $302.50. | $302.50 |
| Effective Date | Effective date for a particular incentive offer | 10/01/07 |
| Stale Date | End date for a particular incentive offer | 01/01/08 |
| Store Location | Physical store location to be referenced with the incentive offer | STORE #123; DALLAS, TX |
| Phone Number | Merchant phone number to be referenced with the incentive offer | 214-000-0000 |
| Registered Payee | Indicates if payee is registered (registered payees will not receive a paper check payment) | YES |

FIG. 11

CLEARED PAYMENT FILE

This file is established by the financial institution or remittance processor to notify service provider of check payments which cleared per usual bank clearing (e.g. offers were not accepted online or offline).

| REQUIRED FIELD | DESCRIPTION | EXAMPLE ENTRY |
| --- | --- | --- |
| Check Number | Check number | 123456789 |
| Funding Account | Funding account number (corporate good funds) | 123456789 |
| Payment Amount | Payment amount ($) | $275.00 |

FIG. 12

SYSTEM AND METHOD FOR PROCESSING PAYMENTS

CROSS REFERENCE TO RELATED APPLICATIONS

This application claims benefit of U.S. Provisional Application Ser. No. 60/888,287 filed Feb. 5, 2007 and U.S. Provisional Application Ser. No. 60/870,104 filed Dec. 15, 2006 each of which are hereby incorporated herein by reference.

TECHNICAL FIELD

This invention relates to a method of processing payments. Specifically this invention relates to a system and method of providing alternative payment options to recipients of checks.

BACKGROUND ART

Online bill payment adoption and utilization continues to expand at a rapid pace. Online bill payment systems offered by financial institutions and/or remittance consolidators often include a web site at which users may input information necessary for preparing and sending payments to businesses and individuals. The information provided by the users to pay bills may include the name and address of the payee, an amount of a payment, as well as the particular payee account associated with the user for which the payment is being sent. For example, if the payment is being sent to a local supply company, the payee account may correspond to the user's account number at that company.

While the majority of such payments are delivered electronically, a significant portion must be sent via relatively costly paper check to the payee. Thus there exists a need for a system and method which lowers the costs associated with the payment process, and/or which generates new income, which can offset portions of these costs.

DISCLOSURE OF INVENTION

It is an object of at least one embodiment of at least one invention described herein to provide a method and system of processing payments.

It is a further object of at least one embodiment of at least one invention described herein to provide a method and system of processing payments, which may reduce costs associated with processing payments.

It is a further object of at least one embodiment of at least one invention described herein to provide a method and system of processing payments, which may offset costs associated with transferring payments with new revenue.

Further objects of one or more embodiments of at least one invention described herein will be made apparent in the following Best Modes For Carrying Out Invention and the appended claims.

The foregoing objects may be accomplished in at least one embodiment by a method and system that enables a payee on a payment (such as a check) to accept an offer to exchange the check for an offer by a third party such as a gift card. When the offer is accepted the check is voided.

The method may be carried out using at least one server. The at least one server is operative to receive data representative of a plurality of payments to which checks are intended to be generated and issued to a plurality of different payees. For example, such data may have been generated by a remittance processor, a financial institution and/or another entity that issues remittances such as checks to payees on behalf of users. The remittance processor and/or financial institution may include an online-bill payment web site that provides customers of the remittance processor and/or financial institution (e.g., a payer) with a web-based interface for requesting payments to be transferred from the payer to another entity (e.g., a payee). Such payments may correspond to ACH transfers from the payer's account at the payer's financial institution to a predetermined payee account at the payee's financial institution. In other cases payments are withdrawn from the payer's account at time of processing (e.g., Good Funds Model) and an actual ACH transfer to the payee's account is funded by one master corporate account.

However, in many cases ACH transfers are not possible (e.g., payee is unwilling, unable and/or is unaware of how to accept electronic remittances), and the payment is initiated by sending a payment to the payee in the form of a check. Such a check is typically drawn on a financial account other than the financial account of the payer. For example, payments may be withdrawn from the payer's account at time of processing by the payer's financial institution and/or remittance processor (e.g., Good Funds), and the check received by the payee may then be drawn on the corporate funding account of the financial institution and/or remittance processor on behalf of the payer. Also, in some cases the check may be drawn on the payer's account (e.g., Risk Model) and not a corporate funding account.

Each payment represented in the payment data received by the at least one server may include data representative of a payee and data representative of a payment amount of value to be transferred to the payee. The data representative of the payee may include at least the name of the payee and a payee address. The data representative of the payee may also include reference information such as an account number or invoice for which the payment is intended to be directed. In an embodiment, the data representative of a payment may be received by the at least one server from the financial institution and/or remittance processor in the form of a message, file or other electronic communication which is referred to herein as a check payment activity file. Also in an embodiment, data representative of payments may be stored by the at least one server in one or more tables in one or more data stores collectively referred to herein as a payment database.

The at least one server is also in operative connection with at least one data store that includes stored therein data representative of at least one third party offer from one or more third parties. The third party offer may correspond to an offer to be made to one or more payees regarding options for exchanging the value of the payment for third party value provided by the third party. It is to be understood that third party value corresponds to: at least one good or service provided by the third party; at least one item capable of being redeemed for at least one good or service provided by the third party such as a gift card, gift certificate, or voucher; and/or data capable of being redeemed for at least one good or service provided by the third party such as an electronic code, promotional number, gift certificate number, or any other data capable of being communicated to the user. For example, the third party offer may be to exchange the payment such as the check for third party value in the form of an item such as a gift card capable of being used to purchase goods or services provided by the third party in an amount that is equal to or more than the face value of the check.

The data representative of the third party offers from one or more third parties may be stored in one or more tables in one or more data stores, which are collectively referred to herein as a merchant offer database. The merchant offer database may be populated with data received from one or more third parties regarding the third party offers being made. In an embodiment the data representative of third party offers received by the at least one server from one or more merchants, retailers, or other third parities may be in the form of a message, file or other electronic communication which is referred to herein as an incentive offer file.

In addition, the method may include for at least one of the payments, operating the at least one server to enable the data representative of the at least one third party offer to be mailed to the payee address associated with the at least one payment along with a check for the payment amount of value associated with the at least one payment. In an embodiment, the financial institution, remittance processor or another entity such as a service provider may be responsive to the data provided by the at least one server to print indicia describing the offer on paper attached to the check and/or a separate piece of paper to be mailed with the check. However, as discussed below in more detail, if the payee has previously redeemed an offer, instead of printing and mailing the check and the offer for subsequent payments, the payee may be electronically notified of the offer and/or receive an electronic transfer of the payment.

In an embodiment, the at least one server may selectively determine which one or more offers to include with which payments responsive to the third party offer data included in the merchant offer database and the payment data received from the financial instruction and/or remittance processor. Matches between one or more third party offers and each payment determined by the at least one server may be stored in at least one table of at least one data store which are collectively referred to herein as a payment incentive database.

In an embodiment that includes a remittance processor (and/or a financial institution) and a service provider, the service provider may operate the described at least one server and at least one data store. The remittance processor and/or the financial institution may then operate its systems to interface with the at least one server of the service provider to send payment data to the at least one server and in return receive data representative of the third party offers determined by the at least one server to include with checks printed and mailed out by the remittance processor and/or the financial institution. With respect to the described remittance process and/or financial institution described herein, it is to be understood that in some cases the financial institution processes remittances in-house on behalf of the payer while in other cases (vast majority) the work is sent to third-party/external remittance processor.

In another embodiment, the service provider may print the third party offers and the associated checks responsive to the payment data received from the remittance processor and responsive to the third party offers included in the merchant offer database. In another embodiment the remittance processor may print and mail the check to the payee, and the service provider may separately mail a letter regarding the third party offer associated with the check to the payee. In other embodiments, other combinations of one or more entities printing, sending, matching and/or correlating checks and associated third party offers may be carried out responsive to the data representative of payments and data representative of the third party offers.

In the described embodiments, the method may also include receiving with the at least one server, data representative of an acceptance of the at least one third party offer. Such data may be received from the third party and/or the payee. For example, in an embodiment, the payee may access the at least one server through a web page interface of a web site on the Internet and provide data sufficient to indicate that a third party offer made to the payee has been accepted. Also, if more than one third party offer was provided, the web page interface may enable the payee to choose which offer to accept.

Also in another embodiment the payee (or a representative of the payee) may take the incentive offer and/or check directly to the third party and personally indicate acceptance of the third party offer. In response, the third party may carry out accessing the at least one server (such as through a web site interface) and provide to the at least one server the data representative of the acceptance of the third party offer. In alternative embodiments, the third party may include a dedicated terminal capable of providing data representative of one or more accepted offers to the at least one server.

In embodiments, the method includes the at least one server operating responsive to the receipt of the data representative of the acceptance of the third party offer by either the payee or the third party. For example, the at least one server may be responsive to the acceptance data to cause the check mailed with the third party offer to be voided. In addition, the at least one server may cause value corresponding to at least a portion of the payment amount associated with the at least one payment (e.g., check) to be transferred to the third party entity associated with the at least one third party offer that was accepted. Also, to enable the payee to receive value for the acceptance of the offer, the at least one server may communicate with the third party entity to cause third party value associated with the third party offer to be transferred physically or electronically to the payee or a representative of the payee.

It is to be understood that voiding a check or causing a check to be voided corresponds to an electronic and/or physical process which makes the check invalid for purposes of being cashed or deposited in exchange for value using a bank clearing process. For example a check may be voided by physically marking the text "void" on the check, cutting up the check, or destroying the ability of the check to be deposited or cashed via another physical process. Also for example a check may be voided by communicating a request to the remittance processor or financial instruction having the account upon which the check is drawn to have the check electronically associated with a status that prevents the check from being authorized as a valid enforceable check permitted to be cashed or deposited in exchange for value. The resulting electronic status caused by voiding the check may correspond to a stop payment status, a revoked status, a voided status or any other status which makes the check invalid for purposes of cashing or depositing the check through a bank clearing processes. In an embodiment, the data communicated to a financial institution or a remittance processor representative of the request to void a check may be in the form of a message, file, or other electronic communication which is referred to herein as a converted payment file.

In an embodiment, the value associated with the payment may first be transferred from the remittance processor and/or the financial instruction associated with the payer to the service provider that operates the at least one server. The service provider may keep a portion of the payment amount of value as a transaction fee. The balance of the payment amount of value may then be transferred to the third party whose third party offer was accepted for the particular payment. However, it is to be understood that in alternative embodiments the one or more payments may be bundled together from a financial institution and/or remittance processor and portions thereof may be transferred in predetermined amounts between the service provider and one or more third parties.

As discussed previously, third party value provided to a payee in exchange for voiding a check may correspond to a gift certificate, gift card, electronic certificate, promotional code or any other physical item or electronic data that can be redeemed from the third party for goods and/or services provided by the third party. For third party value that is a physical item such as a gift card, the third party may mail the gift card to the payee that accepted the offer. Also, if the payee or a representative of the payee accepted the offer in person at a location of the third party (e.g., a place of business for the third party), the payee may directly acquire the third party value (e.g., a gift card) at the third party location. If purchases are also being made by the payee at the time the offer is redeemed, all or portions of the third party value associated with the offer may be applied to the purchase price of the purchases. Any remaining portion (if any) of the third party value associated with the offer may be issued as a gift card, voucher or other item to be used at a later time.

Also in embodiments, rather than receiving a physical item corresponding to third party value such as a gift card, the third party may electronically send third party value to the payee such as by sending a certificate code or number via e-mail or a web page to the payee. It is to be understood that third party value may correspond to both physical articles such as a gift card and non-physical information such as a gift certificate code or other number.

In an embodiment, when the user takes the payment (e.g., a check) directly to the third party location, a representative of the third party may access the at least one server as discussed previously through a web page interface or a dedicated device to confirm the acceptance of the third party offer. The at least one server may also send data representative of a confirmation or an authorization that the third party value may be exchanged for receipt of the physical check mailed to the payee. Although the check will be electronically voided as discussed above, the third party may also cause the check to be marked void and returned to the service provider or may otherwise destroy the check. Typically the third party will not return the check to the payee.

Also, in cases where the check has already been subject of an exchange of a third party offer (either online or by the third party) the at least one server is operative responsive to a second attempt to confirm an acceptance of a third party offer to cause data representative of a denied authorization to be communicated to the third party. As a result the third party can be prevented from exchanging a check that has been previously exchanged online or at another third party location.

In an embodiment, fund transfers to the merchant for the check amount minus a service fee may be carried out in an overnight batch settlement between the third party and the service provider. However in an alternative embodiment, fund transfers may be carried out individually (rather than in batches) at other times such as in response to the an electronic confirmation by the third party through a web interface that the third party value has been accepted.

In an embodiment, when a user accepts a third party offer online through communication with the at least one server through a web page interface for example, the payee may provide registration information. Thus in an embodiment the method may include storing registration information received from a payee in at least one data store. Such registration information may include preference data which influences how the described method will be carried out for further payments made to the same payee. For example, the preference data may include data representative of a request for the at least one server to notify the payee by e-mail before a check is mailed to the payee. The payee may access the at least one server through an online web interface after receiving the e-mail to decide whether to accept a third party offer in exchange of the payment, receive a check, or initiate a direct electronic transfer of the payment to a designated financial account provided by the payee.

In an embodiment, the at least one server may be operative to compare the data representative of a payment received from a financial institution and/or a remittance processor to the registration information provided by the payee and/or previous payment data stored in the payment database to determine which payees are to receive e-mail or other types of electronic communications in place of mailing the check to the payee.

As will be appreciated, the foregoing descriptions of features, relationships and steps of one or more embodiments need not meet all or any of the foregoing objects. Also embodiments need not include all of the features described herein. Additional aspects and embodiments within the scope of the claims will be devised by those having skill in the art based on the teachings set forth herein.

BRIEF DESCRIPTION OF DRAWINGS

FIG. 6 shows information in a merchant incentive offer file that may be used to populate a merchant offer database.

FIG. 8 shows information in a registered payee database.

FIG. 9 shows information in a converted payment file that may be communicated to a financial instruction and/or a remittance processor to void one or more checks exchanged for third party offers.

BEST MODES FOR CARRYING OUT INVENTION

Referring now to the drawings and particularly to FIGS. 1-4, there is shown therein a schematic view of method steps that may be carried out to enable a user to exchange a payment such a check for an offer from a third party worth equal to or more in value than the check.

Figure 1:
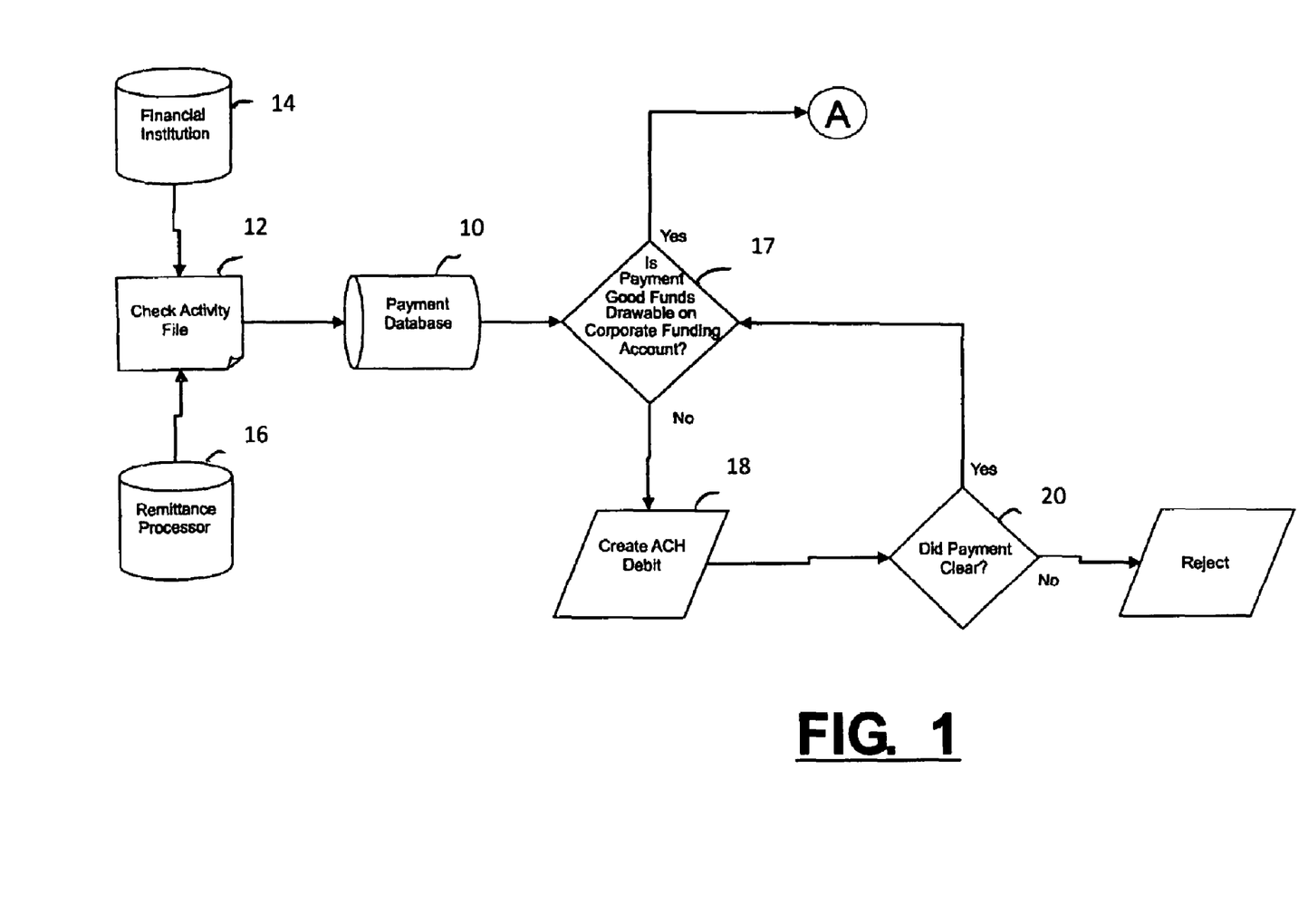
FIGS. 1 and 2 represent a schematic view of a system and method for issuing checks with one or more third party offers.

For an embodiment, FIG. 1 illustrates the steps in the creation of a payment database 10. The payment database 10 includes stored therein data representative of payments, which data is usable to generate and send payments such as checks to payees on behalf of payers. In an embodiment at least one server may populate the payment database 10 responsive to receipt of payment data in the form of a check activity file 12 or other forms of electronic communication, from one or more financial institutions 14, remittance processors 16, and/or payment consolidators. Such financial institutions or remittance processors may generate such payment data responsive to instructions received from payers using an online web interface directed to bill payment or any other electronic or manual system of receiving instructions from payers to send payments to payees. The payment data included in the check activity file 12 will typically include instructions for payments that could not be processed electronically and thus include information necessary to generate and send checks to the payees.

The entity operating the at least one server described herein may correspond to a separate entity referred to herein as a service provider. However, it is to be understood that the steps carried out by the at least one service provider and/or at least one server may be carried out by one or more entities such as the financial institution 14 and/or the remittance processor 16.

Figure 5:
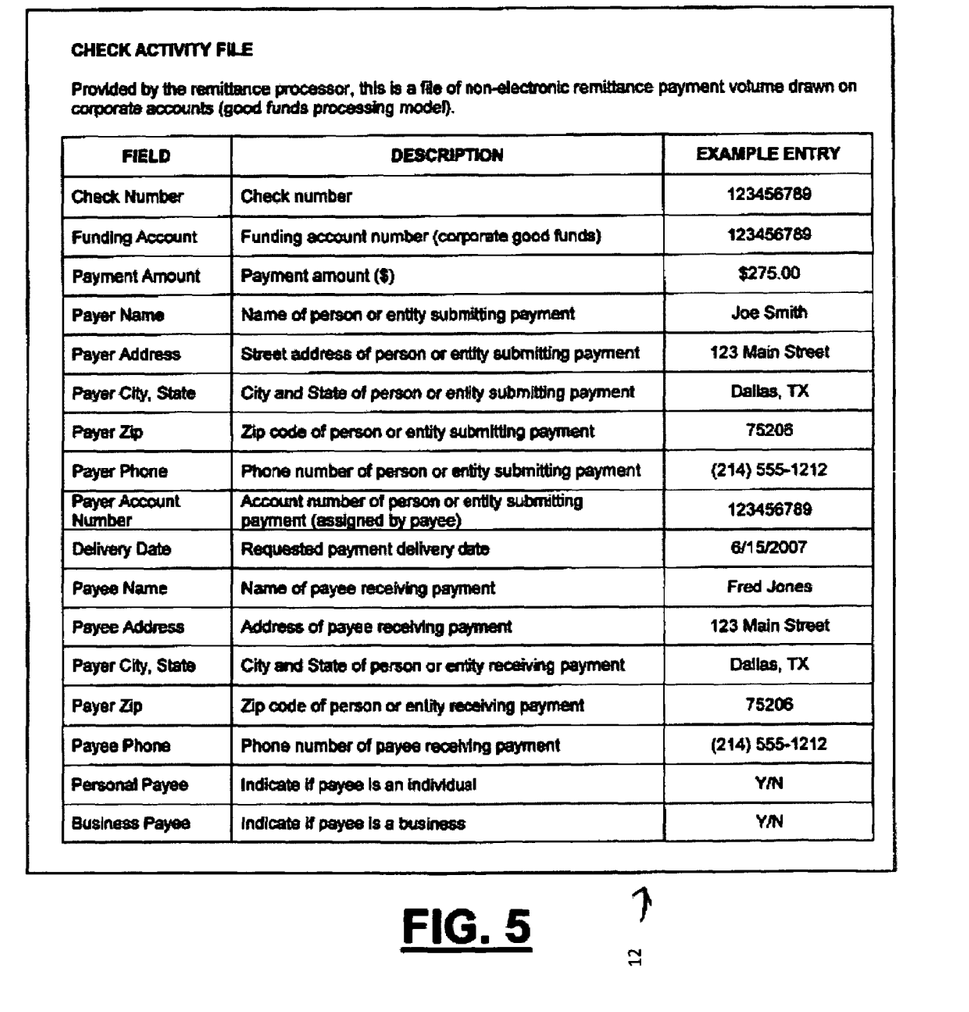
FIG. 5 shows information in a check activity file that may be used to populate a payment database.

FIG. 5 shows an example of a check activity file 12 including examples of the types of information stored therein for one or more payments. This information may include data such as the payee name, payee address, payee telephone number, payee e-mail address, payer name, payer address, payer account number and payer telephone number. In addition, the information included in the payment file may include a check number, payment amount, funding account (e.g., checking account number and bank routing and transit number) and other information used to create a payment in the form of check. All or portions of the information included in the received check activity file 12 may be stored in the payment database 10.

Figure 2:
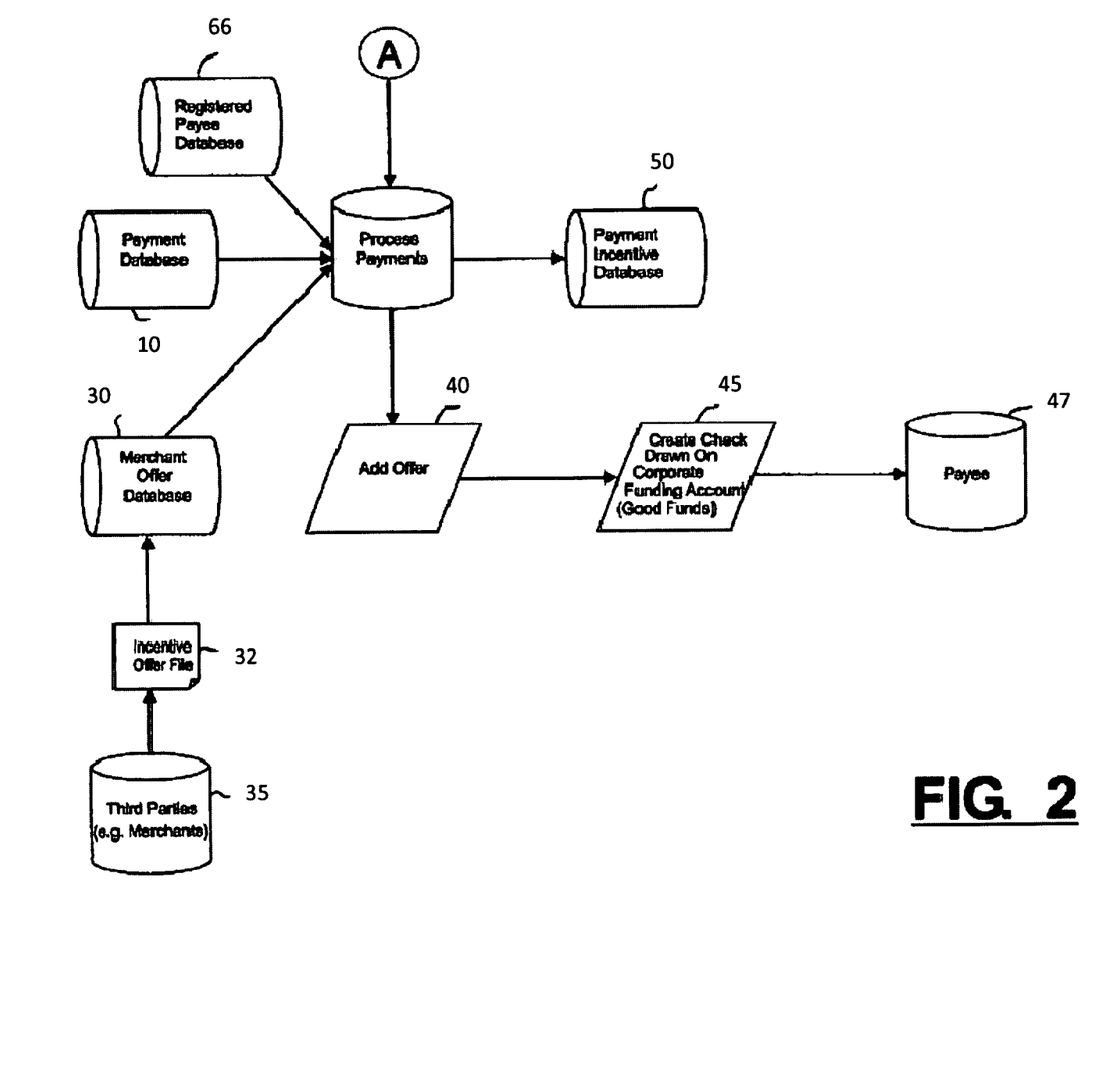

As used herein, the at least one server may be operative to determine 17 when a payment is processed by a financial institution or remittance processor using a "risk" funding model or a "good funds" model. A risk funding model may correspond to when the payment is funded by an account of the payer rather than a corporate funding account of the financial institution or remittance processor (e.g., a good funds model). Referring back to FIG. 1, if the payment corresponds to a "risk" funding model, the service provider operating the at least one server may be operative to cause value corresponding to the payment to be transferred from the payer's account to an account of the service provider. This may be carried out by creating an ACH Debit 18 back to the originator corresponding to the funding account included in the payment data (e.g., an account of the payer). If the ACH Debit clears 20, a corresponding check will then be written on the service provider's funding account 45 as shown in FIG. 2 and mailed to the payee 47. Thus, the service provider will process all check payments as "good funds". In addition, to comply with federal law, an electronic (ACH) pre-note may be created to be sent to the payer's bank to inform the bank that the service provider is authorized to debit the payer's account.

However, if payments are processed by the financial institution or remittance processor using a "good funds" model, the ACH debit process above is not necessary as funds would have already been removed from payer's account. In this case, checks may be written on the financial institution or remittance processor account and not necessarily that of the service provider. Fund settlement would occur in batch between the financial institution or remittance processor and service provider only for those converted payments. For example, if a $250 check payment is exchanged at a third party merchant for third party value (e.g., merchant gift card), $250 funds would flow (in batch) from financial institution to service provider and then $250 less processing fee would flow (in batch) from service provider to the third party merchant. In addition to these described embodiments of transferring funds, it is to be understood that embodiments may use other combinations of processes of carrying out funds "settlement" between the financial institution, remittance processor, service provider and/or third party.

Depending on whether the payee included in the payment data has previously registered with the system to exchange payments for third party offers, the method may vary. For example FIG. 2 shows example steps of the method when the payee associated with the payment has not previously used the described system and/or has not previously registered with the system. Here, the at least on server operated by the described service provider may be in operative connection with at least one data store that is operative to store therein data representative of third party offers. As used herein such a data store is referred to as a merchant offer database 30. The third party offer data included in the merchant offer database identifies/defines unique offers and associated "offer codes" corresponding to gift cards, gift certificates and/or other third party value that may be exchanged in an equal or greater value than the value of a check. Information regarding the third party offers stored in the merchant offer database 30 may be selectively communicated to payees along with the checks being sent to the payees.

In an embodiment, the at least one server may populate the merchant offer database 30 responsive to receipt of third party offer data in the form of a merchant incentive offer file 32 or other forms of electronic communication, from one or more merchants 35. The term "merchant" as used herein is intended to pertain to any third party entity that offers the payee a special incentive offer to utilize online check payment funds at their establishment.

FIG. 6 shows an example of an incentive offer file 32, including examples of the types of information stored therein for one or more third party offers. This information may include data such as an incentive offer percent, incentive offer matrix or other numeric data that can be used to calculate the amount of value being offered to the payee to exchange a check.

For example, if the incentive offer corresponds to 5%, the amount of value of a third party value being offered in exchange for a check in the amount of $100 may be the check amount ($100) plus a 5% incentive amount of ($5) for a total of $105. Thus the amount of value of the third party value being offered to the payee in exchange for the amount of value of the check is greater than the check amount.

In another example, the third party offer data included in the merchant offer database may correspond to a matrix of ranges of check values and the corresponding value of the gift card or other third party value that is offered in exchange. For example, the third party data may specify that check amounts of between $100.01 and $250.00 are offered third party value in an amount corresponding to the sum of the amount of the check plus an incentive offer of $10.

In addition, the third party offer data may include information regarding characteristics of the payees which are selected by the at least one server to receive the third party offers. For example, the third party offer data may specify that the offer is intended to be communicated to: person only payees, business only payees, business payees associated with a specific SIC code, payees in particular states or other addresses ranges and/or to a payee only one time or other limited number of times. Also the third part offer data may specify limits on the offer, such as the date ranges the offer is active, a volume limit which specifies the maximum number of offers that may be sent to payees, an incentive limit on the maximum value of an offer for an individual payee and an incentive limit on the total value of all the offers sent to payees.

Figure 7:
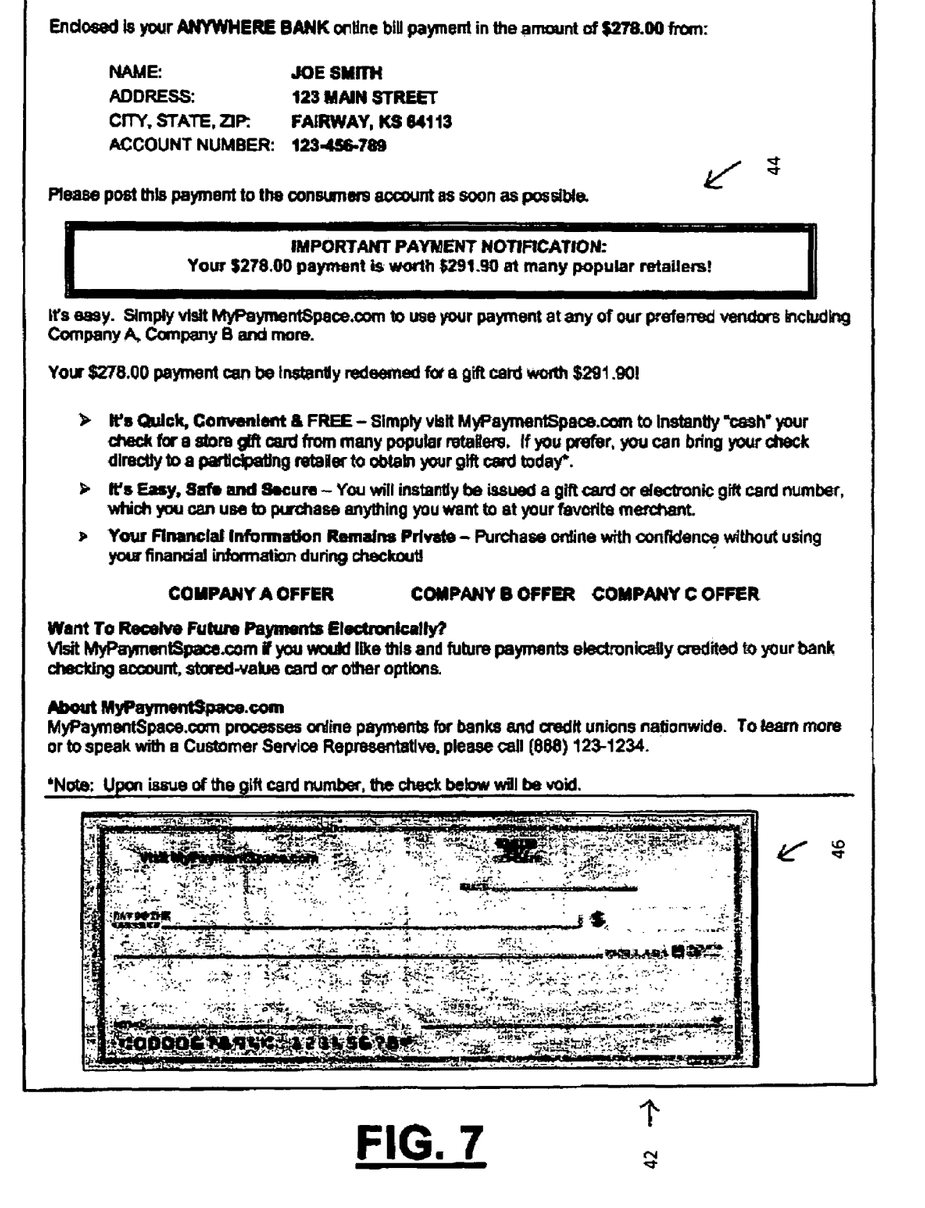
FIG. 7 shows an example of a paper mailed to a payee that includes a check and at least one third party offer.

In an embodiment, the at least one server is operative to match third party offers to particular payments by comparing the particular characteristics or limits specified in the third party offer data stored in the merchant offer database 30 to the payment data received by the at least one server. When a match between a payment and a third party offer is determined by the at least one server, the at least one server is operative to cause the third party offer to be communicated to the payee along with a check corresponding to the payment. For example as shown in FIG. 2, the offer may be added 40 to the paperwork included with or printed with the check. FIG. 7 shows an example of paperwork 42 that is mailed to the payee. In this example information about one or more third party offers 44 is printed on the same paper as the actual check 46. However, it is to be understood that in alternative embodiments information about one or more third party offers may be printed on a separate paper included with the check and mailed to the payee.

For each check that third party offers are included therewith, the at least one server may store a record thereof in a payment incentive database 50. Such a payment incentive database may be accessed by the at least one server in response to an acceptance of an offer by a payee to determine which offers were actually sent to the payee and whether or not one of the offers has already been accepted or rejected by the payee. Also in an embodiment, the information about one or more third party offers 44 included with a check 46, may include instructions on how to accept the offer and/or if desired include instructions on how to indicate/change preferences for electronic delivery of future payments or offers in place of receiving future checks.

Figure 3:
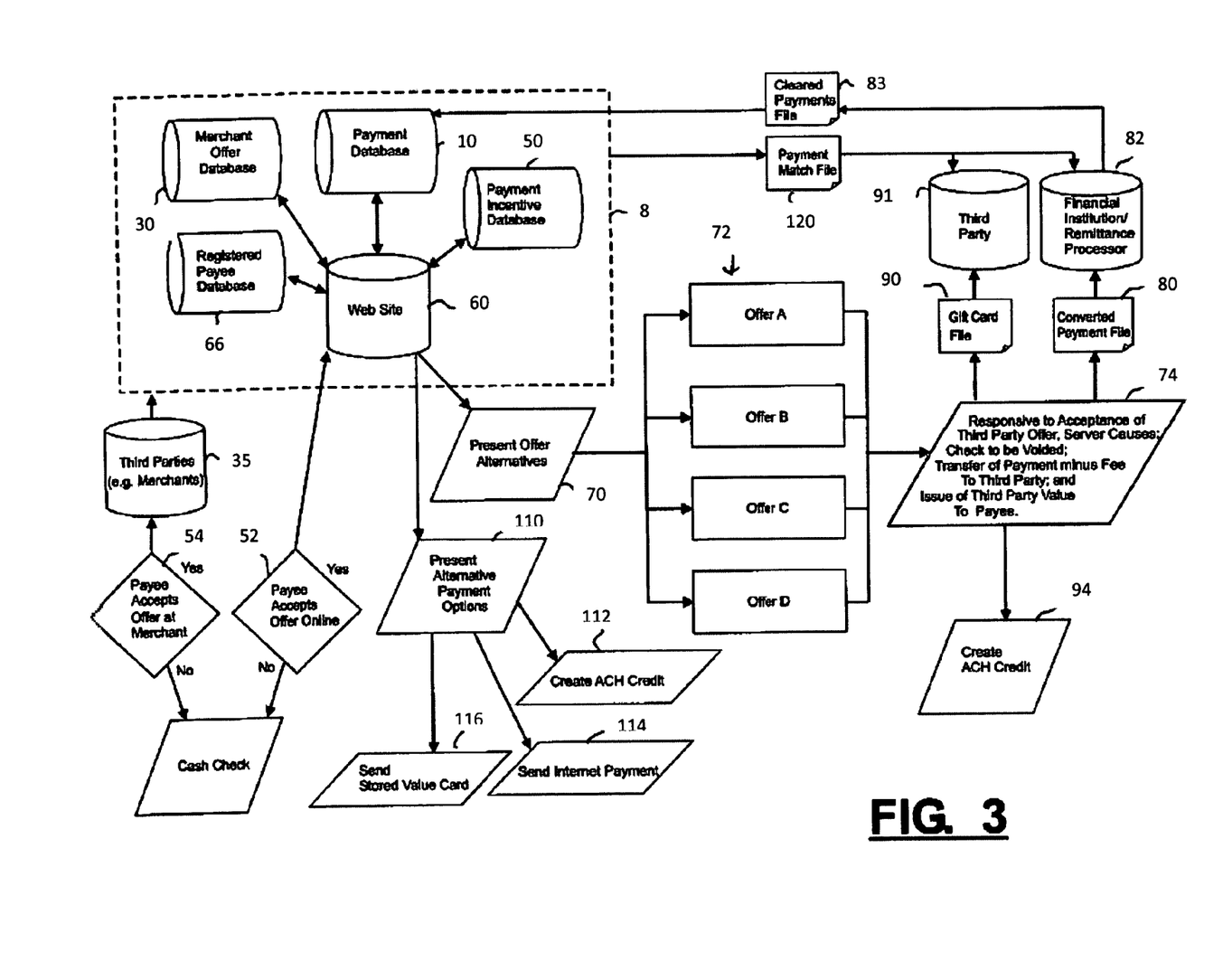
FIG. 3 represents a schematic view of a system and method for accepting third party offers in exchange for a payment such as a check.

Referring to FIG. 3 in an embodiment the acceptance of an offer and/or the indication of delivery preferences regarding further payments may be carried out using an online web site 60 or other system operated by or in operative connection with the at least one server 8. For first time users of the described system, the web site 60 may require the payee to register with the system to provide an e-mail address, user ID, password, delivery preferences for further payments, and other information that may be useful for interfacing and authenticating the payee for future transactions involving the system. Such registration information may be stored by the web site and/or by the at least one server in a registered payee database 66. FIG. 8 shows an example of registration information 68 that may be received through use of the web site 60 and stored in the registered payee database 66. Registration information stored in the payee database 66 may also include unique access information which is usable by the system and users to enable subsequent access to the web site to accept future offers, modify delivery preferences and/or carry out other activities associated with the described system. In embodiments access information usable to control access to the web site may include user IDs/passwords. However, it is to be understood that other embodiments may use other or additional forms of access information and/or authentication mechanisms such as digital certificates, tokens, biometrics, and/or any other type of credential or authentication mechanism.

After a first time user registers with the system or after a registered user logs into the system, the web site 60 may be operative to provide on a web page a selection 70 of the one or more third party offers 72 originally associated with one or more payments for the payee logged into the system. Such a list may be populated responsive to the information in the payment incentive database 50 regarding the one or more third party offers communicated to the payee. The described web site may enable registered users to accept a third party offer by having the user confirm a selection to receive an electronic card number or a mailed gift card or other third party value for the amount of the check remittance plus the incentive offer amount specified by the third party offer selected by the user.

In the described embodiment, the acceptance of a third party offer triggers 74: the voiding of the check so that the check cannot be deposited or cashed at a financial institution; the issuance of the third party value to the payee or a representative of the payee; and the transfer of the amount of value of the check minus a service fee to the third party that issued the third party value. This may happen in overnight funds settlement via ACH Batch or corresponding process.

The voiding of a check may be carried out by the at least one server sending instructions to the financial institution upon which the check is drawn to cause the financial institution to associate the check with a void or canceled status. Such instruction regarding one or more voided checks may be communicated in a converted payment file 80 or other electronic communication sent to the financial institution and/or the remittance processor 82. FIG. 9 shows an example of the information that may be included in a converted payment file 80.

Figure 10:
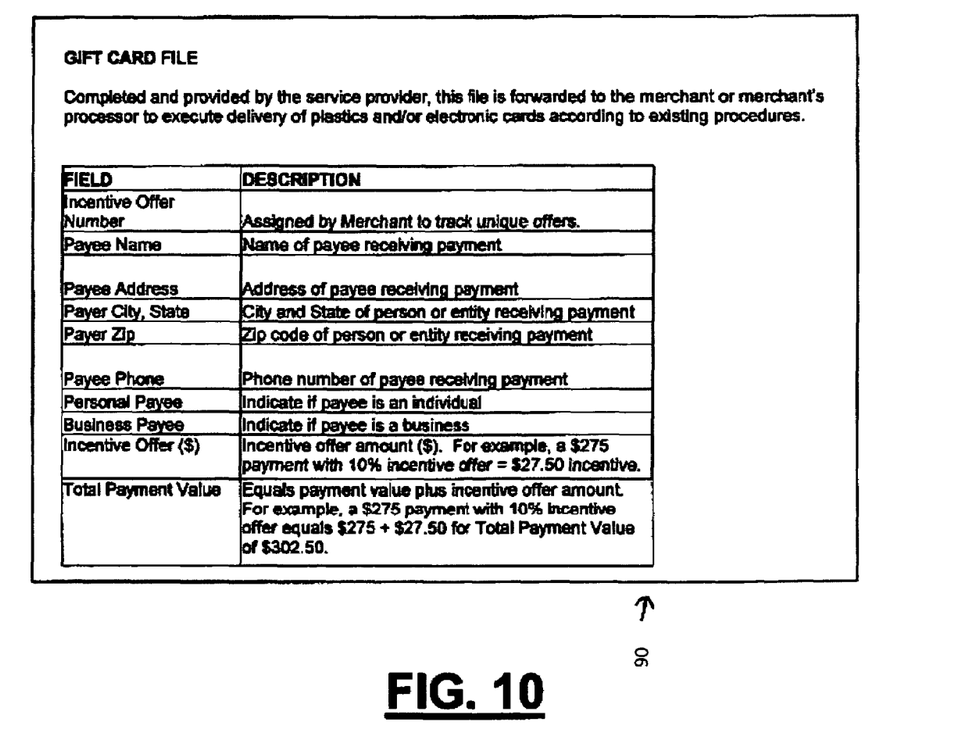
FIG. 10 shows information in a gift card file that may be communicated to a third party to execute delivery of a third party value to a payee.

The issuance of the third party value may be carried out by the at least one server sending instructions to the third party 91 associated with the accepted third party offer to issue the third party value. Issuance of the third party value may correspond to mailing a gift card, mailing a gift certificate, e-mailing an electronic code corresponding to a gift certificate, and/or carrying out other actions specified by the offer and/or selected as a preference by the user using the web site 60. Such instructions regarding the issuance of third party value may be communicated in a gift card file 90 or other electronic communication sent to the third party. FIG. 10 shows an example of the information that may be included in a gift card file 90.

The transfer of the amount of value of the check minus a service fee to the third party that issued the third party value may be done through an ACH credit 94. However, it is to be understood that in alternative embodiments other methods of transferring value to one or more third parties for third party value may be used such as the issuance of checks to the third party drawing on an account of the service provider operating the described at least one server.

Figure 12:
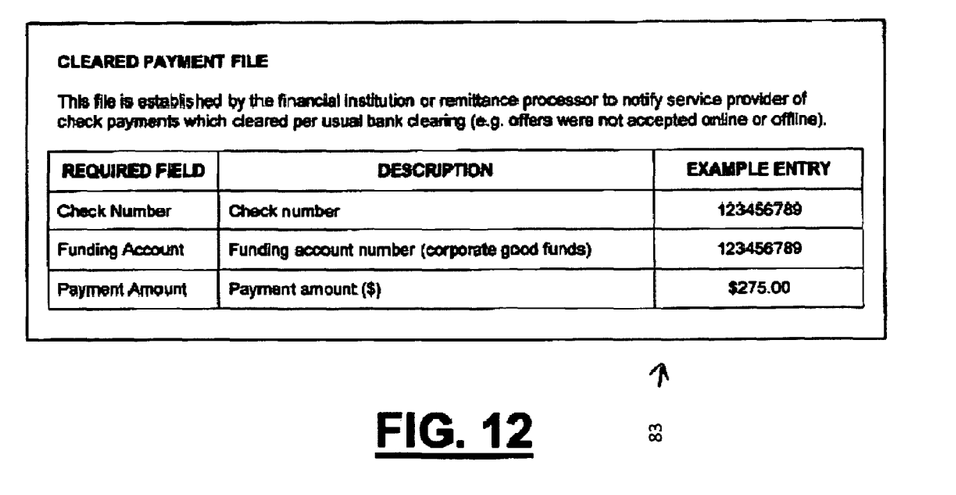
FIG. 12 shows information in a cleared payments file that may be communicated from a financial institution and/or a remittance processor regarding cleared checks.

In embodiments, payees may choose to ignore third party offers received with their checks and instead may deposit the checks with their financial institution. Information regarding the clearing of deposited checks through usual bank clearing processes may be communicated to the at least one server 8 from the financial institutions and/or remittance processors 82 via a cleared payments file 83. The at least one server 8 may be responsive to a cleared payments file 83 to update the payment database 10 to associate corresponding payment records with a status representative of the check having been cleared per usual bank clearing. An example of a cleared payments file 83 is shown in FIG. 12.

Figure 4:
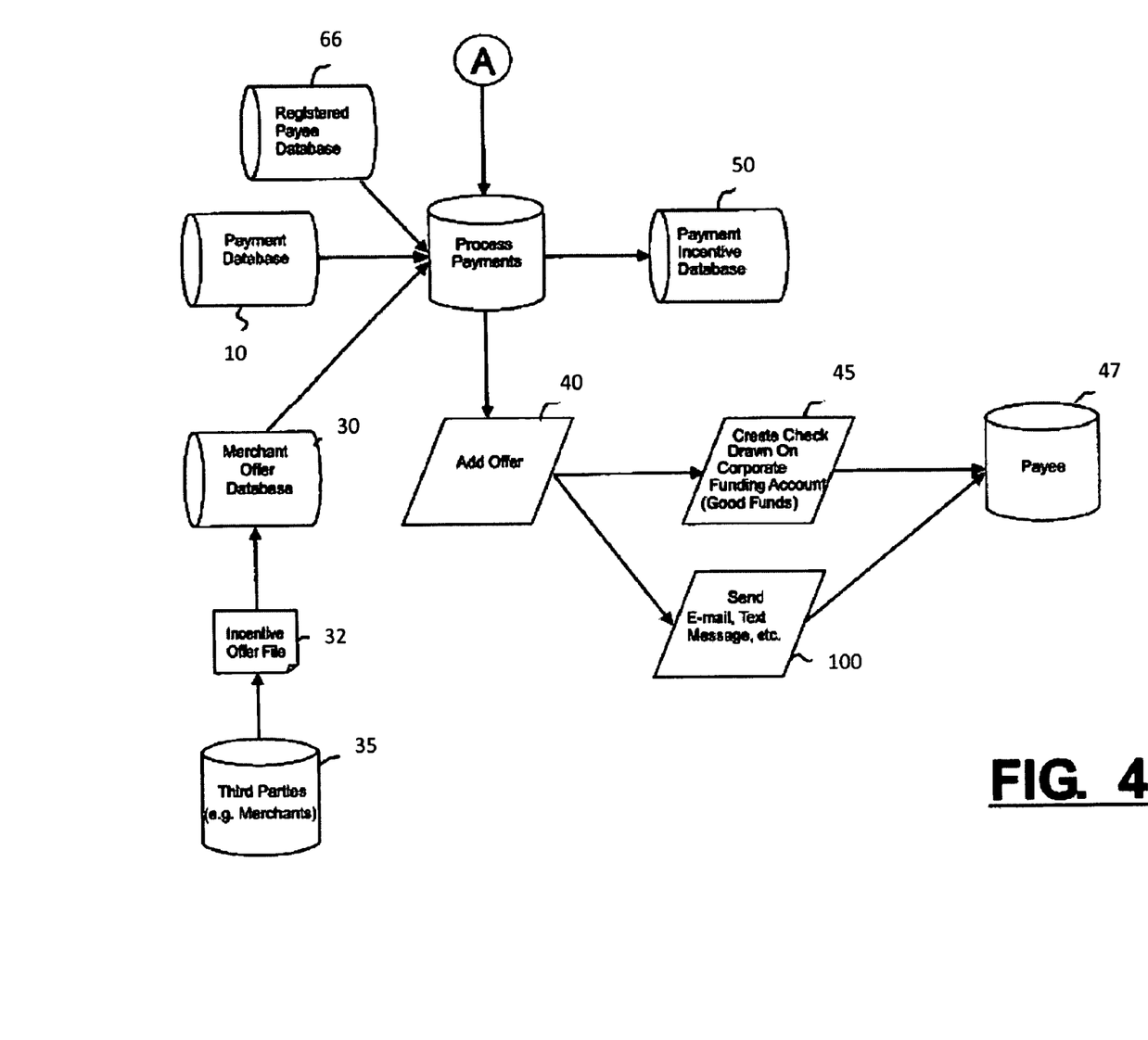
FIG. 4 represents a schematic view similar to FIG. 2, in which an electronic communication such as an e-mail notification is sent to the payee regarding a third party offer.

As discussed previously with respect to FIG. 3, a registered user (e.g., payee) may select or provide delivery preference information to the described web site 60. Such preference information may include a preference to receive further third party offers electronically through an electronic communication such as e-mail message before a check is sent to the payee. Thus when the delivery preferences for a payee specifies sending an e-mail notification rather then sending out a check, as shown in FIG. 4, the system may send an e-mail 100 to the payee. Such an e-mail may be sent to the e-mail address listed in the registered payee database 66 for the registered payee. The information in the e-mail may specify information about the pending payment and one or more third party offers. Responsive to the received e-mail or at other times, the user may log onto the secure website 60 as shown in FIG. 3 to select one of the one or more offers associated with the payment. However, because no check has been sent out, the method can omit voiding a check if an offer is selected. If no offer is selected the described web site may allow the user to select a rejection of all of the offers, in which case the system will send out the check to the payee.

In addition, as shown in FIG. 3, the described web site may also be capable of offering a selection 110 of one or more alternative options to receive the payment instead of a check or third party value. Such selections may include receiving the payment amount: via an ACH transfer 112 to a bank account; via and ACH transfer to an online payment party account (e.g. PayPal) 114; via a transfer to a stored value card 116; or via another process of receiving value equal to the payment amount.

Also, some payees may prefer to not be required to log onto a web site each time an e-mail notification is received to specify how a payment is to be received. Thus in an embodiment for registered users, the web site 60 may provide a selectable option for the payee to establish one-time or recurring delivery preferences (e.g., automatically receive an ACH transfer 112). In addition, if they have not responded to an e-mail notification regarding a third party offer within a fixed or user selectable amount of time (e.g., 2 days) the system may default delivery to an ACH transfer to payee's account on file and/or send a paper check.

In an embodiment, the system may provide a further incentive to payees to accept offers online and/or sign up for e-mail notification of a pending payment and/or automatic ACH transfer of payments. Such an incentive may include the opportunity to receive third party offers with a higher relative incentive amount added to the value of the check compared to users that do not enable ACH transfers of payments.

Figure 11:
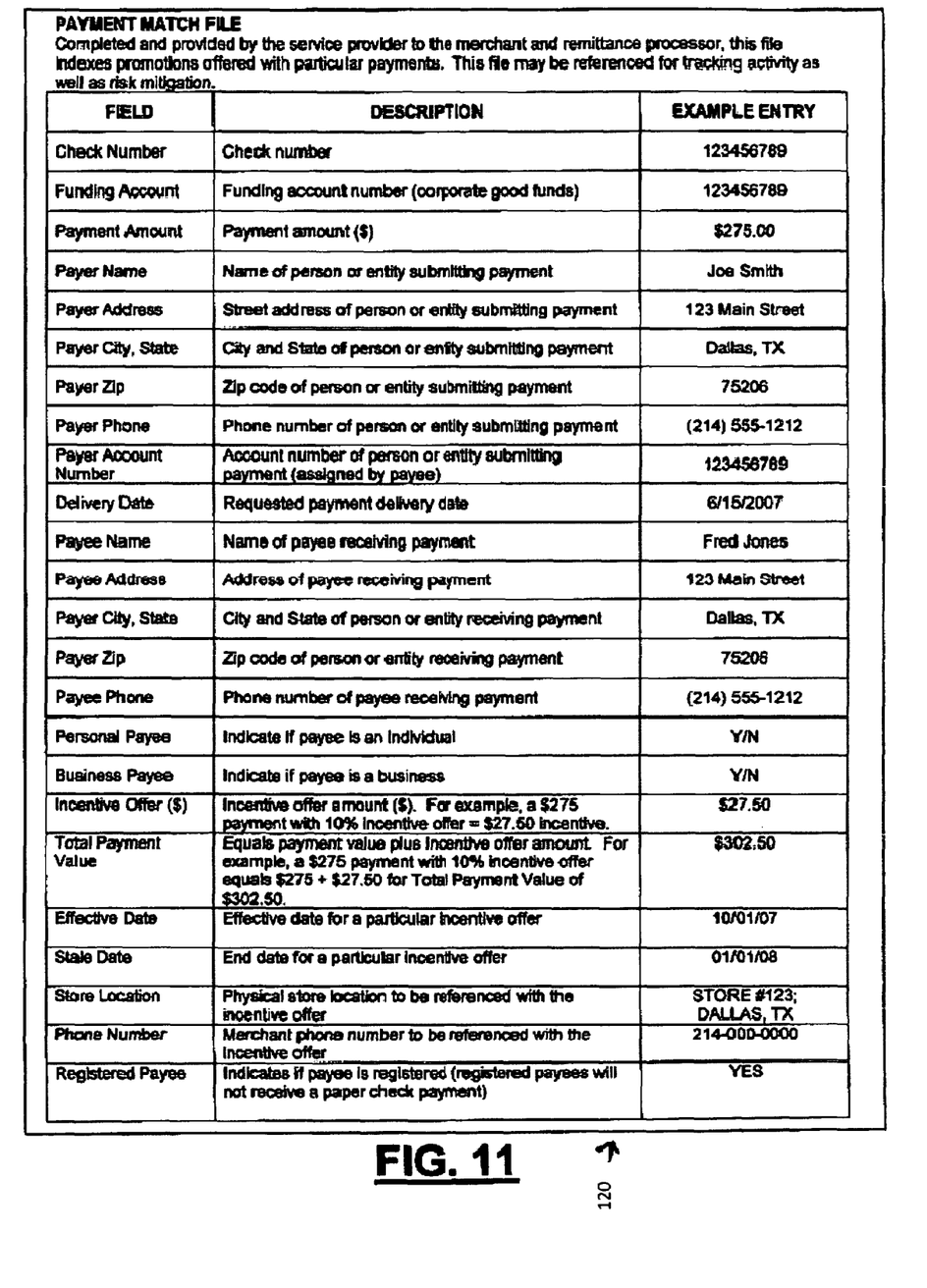
FIG. 11 shows information in a payment match file that may be communicated to a third party and/or a financial institution/remittance processor regarding the acceptance of a third party offer by a payee.

In an embodiment, the at least one server may store information about how the payment was ultimately satisfied (e.g., by check, exchange for third party value, direct ACH transfer, etc.) in a data store such as in the payment database and/or the payment incentive database. Such information may also be communicated to the third party and/or the remittance processor. FIG. 11 shows an example of a communication in a form of a payment match file 120 which shows the information that may be communicated to the third party and/or a remittance processor regarding an acceptance of a third party offer.

In the previously described embodiments and shown in FIG. 3, an online acceptance 52 of a third party offer has been described in which the payee accesses a web site 60 to select an offer. However, as also shown in FIG. 3, in an alternative embodiment, a user may choose to carry out an offline acceptance 54 of the offer by physically taking the mailed paper 42 (as shown in FIG. 7 with the received check 46 and third party offer 44) directly to the third party 35 making the third party offer (e.g., a retail merchant location). In exchange for the mailed paper 42 including the check thereon or therewith, the third party may give the user the third party value. During this exchange the third party may access the at least one server, such as logging into a merchant only portion of the previously described web site 60, to confirm the acceptance of the offer on behalf of the payee.

At this point, the web site is operative to notify the third party through information presented in a web page, that acceptance of the offer is authorized. Authorization may be determined by the at least one server accessing the payment database 10 and/or the payment incentive database 50 to verify that the offer has not been previously accepted and/or the offer has not expired. Confirmation of the acceptance may also trigger the at least one server to cause the check to be voided and to transfer funds in the amount of the check minus a service fee to the third party. In addition, the third party may be instructed to take possession of the check so as to send the check to the service provider and/or to destroy the check. Funds transfer may also occur during nightly batch settlement processes between the service provider and the third party.

In further alternative embodiments, when the payee takes the mailed paper 42 with the received check 46 and third party offer, instead of causing the check to be voided and a transfer of funds to be sent to the third party from the service provider, the payee instead may endorse the back of the check and the third party may deposit the check with its financial institution. In this described embodiment, the third party will confirm authorization to accept the offer by communicating with the server as previously discussed. Confirmation of the acceptance of the offer will trigger the service provider to issue an ACH debit to the account of the third party for the amount of the service fee previously discussed.

In one or more of the previously described embodiments, transfers associated with a particular payment between the accounts of the financial institutions, remittance processors, service provider and/or third parties have been described. However, it is to be understood that such transfers may also be aggregated in batches for common parties for a plurality of payments.

Also, in an alternative embodiment, merchants which accept acceptance of offers offline at a physical location of the merchant, may include terminals such as a point of sale (POS) terminal that is adapted to communicate with the described at least one server 8 to authorize and/or confirm the acceptance of an offer. In such embodiments, the offer may include a number capable of being typed, scanned or otherwise inputted into the POS terminal. The POS terminal may be in communication with a transaction network and/or one or more host processing systems capable of communicating with the at least one server to receive from the at least one server an authorization to permit the exchange of the check for third party value (e.g., a gift card and/or value applied to a purchase).

For some payments, payees may correspond to persons. For other payments, payees may correspond to businesses. For business payees, the payee information associated with a payment (e.g., the payee name on a check) may correspond to the name of the business rather than to a person's name. In order to mitigate risk associated with an unknown person accepting an offer for themselves, or on behalf of a payee that is a business, embodiments may require the person accepting the offer to provide one or more forms of identification for purposes of authenticating the identity of the person. Identification information provided by the person may be stored in the registered payee database 66 during the registration process described previously and/or by the third party merchant. Such identification information may include the name of the person accepting the offer on behalf of the business, the relationship of the person to the business (e.g., employee title), drivers license information, credit/debit card information and/or any other information that can be used to identify the person accepting the offer. Also all or portions of the identification information associated with an accepted third party offer may be included in the converted payment file 80.

In embodiments in which a person takes the check to a third party merchant location to accept the third party offer, in addition to providing the identification information, the merchant may also verify that a photo ID such as a drivers license photo visually corresponds to the person accepting the offer. In alternative embodiments, biometric information may be acquired from the person such as a fingerprint scan or other biometric scan of a physical property of the person.

Computer software instructions used in operating the at least one server and/or web site and connected computers may be loaded from computer readable media or articles of various types into the respective computers/servers. Such computer software may be included on and loaded from one or more articles such as diskettes, compact disks, DVDs and other optical or magnetic media. Such software may also be included on articles such as hard disk drives, tapes, flash memory drives or other read-only or re-writable drives and storage devices. Other articles which include data representative of the instructions for operating computers in the manner described herein are suitable for use in achieving operation of transactional websites and systems in accordance with the described embodiments.

The embodiments of the payment processing system and method described herein have been described with reference to particular software components and features. Other embodiments of the invention may include other or different software components which provide similar functionality.

Thus the new payment processing system and method achieves one or more of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof. The description of the embodiment included in the Abstract included herewith shall not be deemed to limit the invention to features described therein.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

I claim:

1. A method for use by a service provider to assign specific alternative payment options and facilitate exchange of select online bill payments for particular merchant offers, said method comprising:
 a) receiving, at a server of a service provider, data, from a financial institution or remittance processor, wherein the data is representative of a plurality of payments due from an individual or non-government entity, wherein each payment due includes data representative of a payee, a payment amount to be transferred to the payee and a payee address;
 b) receiving from the at least one data store, data representative of at least one third party offer to be mailed to the payee address associated with one of the payments along with a check for the payment amount associated with the payment, wherein the at least one data store is in operative connection with the server; and wherein the at least one third party offer is an amount of value greater than the payment amount associated with the payment;
 c) mailing the at least one third party offer with the check for the payment amount associated with payment to the payee;
 d) receiving at the server, data representative of an acceptance of the at least one third party offer in (c); and
 e) responsive to (d) through operation of the at least one server:
  i) transferring the payment amount associated with the payment to the third party associated with the at least one third party offer accepted in (d) from payor account; and
  ii) transferring the third party offer amount value to the payee or representative of the payee.

2. The method according to claim 1, wherein the data from a financial institution or remittance processor representative indicative of a plurality of payments received in (a) includes data representative of an account from which value associated with the payment is transferable from, further comprising:
 f) determining that the data representative of the account corresponds to an account associated with the individual or non-government entity payor;
 g) initiating an Automated Clearing House (ACH) debit for the payment amount of value associated with the at least one payment;
 h) determining that the ACH debit was successful;
wherein (b) is carried out responsive to (h).

* * * * *